US008698914B2

(12) United States Patent
Irmatov et al.

(10) Patent No.: US 8,698,914 B2
(45) Date of Patent: Apr. 15, 2014

(54) METHOD AND APPARATUS FOR RECOGNIZING A PROTRUSION ON A FACE

(75) Inventors: Anwar Adkhamovich Irmatov, Moscow (RU); Dmitry Yurievich Buryak, Moscow (RU); Victor Dmitrievich Kuznetsov, Moscow (RU); Dmitry Vladimirovich Cherdakov, Balakovo (RU); Hae-Kwang Yang, Gunpo-si (KR); Dong Sung Lee, Seongnam-si (KR)

(73) Assignee: S1 Corporation (KR)

( * ) Notice: Subject to any disclaimer, the term of this patent is extended or adjusted under 35 U.S.C. 154(b) by 123 days.

(21) Appl. No.: 13/380,158

(22) PCT Filed: Jun. 22, 2010

(86) PCT No.: PCT/KR2010/004042
§ 371 (c)(1),
(2), (4) Date: Feb. 23, 2012

(87) PCT Pub. No.: WO2010/151029
PCT Pub. Date: Dec. 29, 2010

(65) Prior Publication Data
US 2012/0140091 A1  Jun. 7, 2012

(30) Foreign Application Priority Data
Jun. 22, 2009  (RU) ............................... 2009123429

(51) Int. Cl.
*H04N 5/228* (2006.01)
*H04N 5/16* (2006.01)

(52) U.S. Cl.
USPC ......... 348/222.1; 348/131; 348/258; 348/370

(58) Field of Classification Search
USPC ........... 348/68, 131, 132, 258, 353, 356, 365, 348/370
See application file for complete search history.

(56) References Cited

U.S. PATENT DOCUMENTS

| 5,517,021 A | 5/1996 | Kaufman et al. |
| 6,002,782 A | 12/1999 | Dionysian |

(Continued)

FOREIGN PATENT DOCUMENTS

| CN | 1877599 A | 12/2006 |
| CN | 101344914 A | 1/2009 |

(Continued)

OTHER PUBLICATIONS

Young-Jun Song, et al., "Side-View Face Detection Using Both the Location of Nose and Chin and the Color Image", Journal of the Korea Contents Association, vol. 3, No. 4, pp. 17-22, Dec. 2003 (English translation of abstract only).

*Primary Examiner* — Hung Lam
(74) *Attorney, Agent, or Firm* — Lerner, David, Littenberg, Krumholz & Mentlik, LLP

(57) ABSTRACT

A method and apparatus for recognizing a protrusion on a face is proposed. The apparatus forms two images, wherein one is formed in a condition in which a target is lighted and another is formed in a condition in which the target is non-lighted. Face regions are detected from the images respectively and then are compared each other. Then, analyzing change in intensity for indicating change in contrast of the compared regions is performed. Based on the result of the analyzing, it is determined whether there is a protrusion in a face presented in the images.

13 Claims, 4 Drawing Sheets

(56) References Cited

U.S. PATENT DOCUMENTS

| | | |
|---|---|---|
| 6,219,640 B1 | 4/2001 | Basu et al. |
| 6,498,970 B2 | 12/2002 | Colmenarez et al. |
| 6,567,775 B1 | 5/2003 | Maali et al. |
| 7,508,960 B1 * | 3/2009 | Bolle et al. .................... 382/117 |
| 7,539,330 B2 | 5/2009 | Rowe |
| 7,738,015 B2 * | 6/2010 | Steinberg et al. .......... 348/223.1 |
| 8,026,976 B2 * | 9/2011 | Tamura ......................... 348/371 |
| 2005/0013599 A1 | 1/2005 | Nakanishi et al. |
| 2005/0041121 A1 | 2/2005 | Steinberg et al. |
| 2006/0174868 A1 * | 8/2006 | Sundhar .................. 128/200.14 |
| 2008/0074536 A1 | 3/2008 | Tamura |
| 2008/0304716 A1 * | 12/2008 | Hirose ......................... 382/118 |
| 2013/0100266 A1 * | 4/2013 | Salsman ........................ 348/77 |

FOREIGN PATENT DOCUMENTS

| | | | | |
|---|---|---|---|---|
| JP | 2003-030647 | * | 1/2003 | ............ H04N 5/243 |
| KR | 2005-0033537 A | | 4/2005 | |
| KR | 2008-0071374 A | | 8/2008 | |
| RU | 2093890 C1 | | 10/1997 | |
| RU | 2245580 C2 | | 1/2005 | |
| RU | 2249514 C1 | | 4/2005 | |

* cited by examiner

METHOD AND APPARATUS FOR RECOGNIZING A PROTRUSION ON A FACE

FIELD OF THE INVENTION

The present invention relates to a field for recognizing a shape. More particularly, the present invention relates to a method and apparatus for recognizing a protrusion on a face.

DESCRIPTION OF THE RELATED ART

Recently, a biometric recognition system has been based on biometric characteristics of a person and is widely used in an access control system and a video system. The biometric characteristics include contour of a face, a fingerprint, a pupil, a voice, a gesture, and others. A face recognition system is considered as a promising field in the fields of the biometric recognition system and has outstanding merits. Specifically, there is no need to use expensive and special equipment or to have physically contact between the equipment and a person. Also, it is possible to recognize human faces securely. Meanwhile, the face recognition system has some drawbacks, and one of them is that it is relatively weak recognizing a face in a photograph or wax figures that were transformed by someone with ill will.

Various solutions for depending a video system or an access control system against attacks related to face transformation have been proposed.

Solutions for which patents have been applied (e.g. Russia patent No. 95115528, U.S. Pat. No. 6,567,775, U.S. Pat. No. 6,219,640, U.S. Pat. No. 6,498,970, and others) disclose that biometric characteristics such as a person's height, fingerprint, voice, and contours of a face are analyzed at the same time, and the passage of a person who has a biometric characteristic that does not pass a recognition process is not admitted.

In addition, U.S. Pat. No. 6,002,782 and Russia Patent Application No. 2,001,122,361 disclose that a three-dimensional (3D) model reconstruction of a face as a reference for recognizing a face is generated. They improve the accuracy of the face recognition as well as protecting a system from the case of presenting a photograph of a person.

U.S. Pat. No. 5,517,021 and Russia patent No. 2249514 disclose measuring dynamic characteristics of a person's face such as a period of winking and a trace of pupils' movement. They may prevent attempts to penetrate a gate with a photograph, wax figures, a mask, and others, based on the dynamic characteristics.

Further, U.S. Pat. No. 6,498,970 discloses a system that asks a person to be passed and reacts to the response of the person. The system analyzes the response including an act and obtains dynamic characteristics such as movements of the person's eyes and head and voice parameters. The dynamic characteristics are compared with values stored in a database and the passage of the person is admitted or rejected based on the result of the comparison.

Also, U.S. Pat. No. 7,539,330 discloses a system and method that analyzes the image obtained by illuminating a subject with light having various spectrums and checks the reality (or vitality) of the face obtained from the image. Here, characteristic values related to materials of elements composing the subject are calculated and it is determined whether the material of the subject is skin of a person based on the characteristic values.

However, most face recognition systems have a drawback of not recognizing the case in which a person with ill will wants to be passed by using a photograph registered in the systems. It is caused by the fact that it is difficult to determine which of a photograph or a real person is a two-dimensional (2D) image obtained from.

DETAILED DESCRIPTION OF THE INVENTION

Object of the Invention

The present invention has been made in an effort to provide a method and system having advantages of determining whether a target to be recognized is a 2D image.

Also, the present invention has been made in an effort to provide a method and system having advantages of recognizing a protrusion on a face.

Technical Object to be Accomplished of the Invention

An exemplary embodiment of the present invention provides a method for recognizing a protrusion on a face. The method includes: forming a first image of a target in a condition in which the target is lighted and a second image of the target in a condition in which the target is non-lighted to obtain two images of the target; detecting a face region from the first image and a face region of the second image from the second image, respectively; comparing the face regions detected from the first and second images; analyzing a change of contrast in the face regions; and determining a protruding degree of a face corresponding to the first and second images based on the result of the analyzing.

The method may determine the protruding degree of a face by comparing two images that are respectively obtained in different light conditions at a short time span. For this purpose, the detecting may detect face regions from the first image and the second image, respectively, and obtain coordinates of the face regions.

The comparing may analyze and compare the face regions detected from the images. At this time, the comparing may extract the face region from the image, obtain and store coordinates of the face regions, normalize the face region, find at least one characteristic point from the face region, and adjust the face region based on coordinates of the characteristic point. Here, at least one pair of characteristic points selected from points that correspond to a center, outer corners of eyes, nose wing, and corner of a mouth in the face region may be obtained.

The analyzing may compare intensity of indicating change in contrast of the face region obtained from the first image and intensity of indicating change in contrast of the face region obtained from the second image based on contrast values of pixels included in the face regions, and calculate and analyze statistical estimation vectors for indicating change in the intensity of the face regions.

The determining may apply a binary classification function to the statistical estimation vectors to determine the protruding degree of a face.

Another embodiment of the present invention provides an apparatus for recognizing a protrusion on a face. The apparatus includes an image forming device for forming a first image of a target in a condition in which the target is lighted and a second image of the target in a condition in which the target is non-lighted to obtain two images of the target; a face region searching device for detecting a face region from the first image and a face region from the second image; a searched region comparison device for comparing the face regions detected from the first and second images; an analyzing device for analyzing change in contrast of the face regions; and a protruding determination device for determining protruding degree of a face corresponding to the first and second images based on the result of the analyzing. In addition, the apparatus may include a light lamp.

The image forming device may include a 2D camera and a frame grabber, and may obtain an image of a target when the light lamp is turned on and an image of the target when the light lamp is turned off. The face region searching device may take coordinates of the face regions detected from the first image and the second image, respectively.

The searched region comparison device may perform, for the images, analysis of the face regions, extracting the face region from the images, storing coordinates of the face region, normalizing the face regions, finding characteristic points from the face regions, and adjusting the face region based on coordinates of the characteristic points. Here, at least one pair of characteristic points selected from points that correspond to a center, outer corners of eyes, nose wing, and corner of a mouth in the face region may be obtained.

The analyzing device may compare intensity for indicating change in contrast of pixels included in corresponding regions for the face regions, calculate statistical estimation vectors based on a difference between the intensity of the face regions, and apply a binary classification function to the statistical estimation vectors to determine the protruding degree of a face.

Effects

According to an exemplary embodiment of the present invention, it is possible to determine the protrusion degree of an image obtained from a target and to identify whether the target is a two-dimensional (2D) image. Therefore, the case in which a person with ill will attempts to access a system with a 2D image such as a photograph can be easily detected, and thereby it is possible to prevent an illegal access.

In addition, without using an expensive stereoscopic three-dimensional (3D) camera and applying a stereo reconstruction algorithm causing a lot of calculation load and cost, it is possible to determine a protrusion on a face and whether a target is a 2D image. Accordingly, it is possible to rapidly determine the protruding degree of a face with a low cost.

DETAILED DESCRIPTION OF THE EMBODIMENTS

Figure 1:
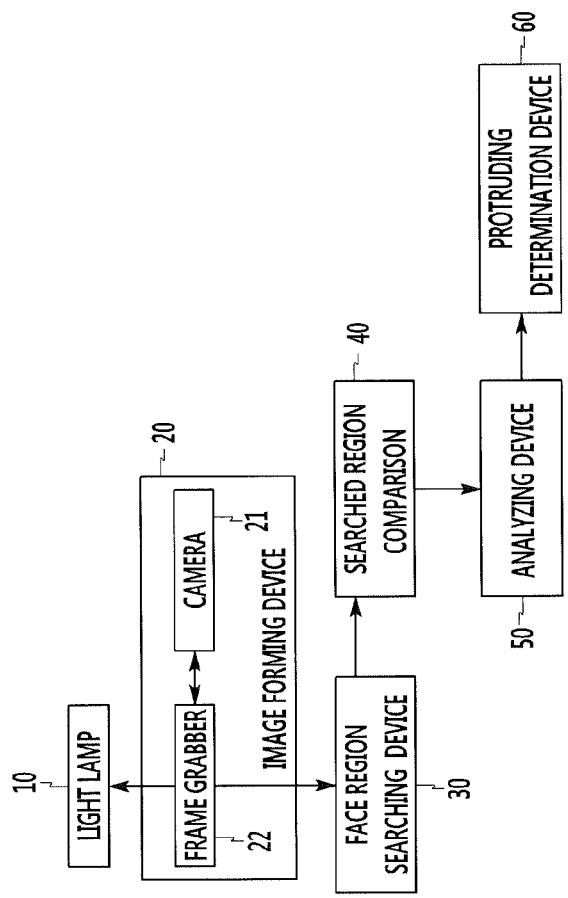
FIG. 1 shows a block diagram of an apparatus for recognizing a protrusion on a face according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, unless explicitly described to the contrary, the word "comprise" and variations such as "comprises" or "comprising" will be understood to imply the inclusion of stated elements but not the exclusion of any other elements.

Next, a method and an apparatus according to an exemplary embodiment of the present invention will be described with reference to the drawings.

A method and an apparatus for recognizing a protrusion on a face according to an exemplary embodiment of the present invention may be used in a field for recognizing a person. For example, they may be used in a biometric face recognition system as a means for detecting the case of deceiving the system by presenting a photograph of a person registered in the system.

FIG. 1 shows a block diagram of an apparatus for recognizing a protrusion on a face according to an exemplary embodiment of the present invention.

As shown in FIG. 1, an apparatus 1 for recognizing a protrusion on a face according to an exemplary embodiment of the present invention includes a light lamp 10, an image forming device 20 for forming at least two images from a target, a face region searching device 30 for searching a face region from the images, a searched region comparison device 40 for comparing the searched face regions, an analyzing device 50 for analyzing the change of light and shade in the compared face regions, and a protruding determination device 60 for determining the protruding degree of a face presented in the images, that is, whether the face is a protruding image.

The apparatus 1 for recognizing a protrusion on a face according to an exemplary embodiment of the present invention determines whether a face presented in an image obtained from a target to be recognized corresponds to a protruding image.

The light lamp 10 may include a filament lamp or an infrared lighting apparatus.

The image forming device 20 includes a two-dimensional (2D) camera 21 and a frame grabber 22. The frame grabber 22 controls the 2D camera 21 to form an image of a target and controls the light lamp 10 to be ON/OFF. The image forming device 20 obtains an image of a target when the light lamp 10 is OFF and also an image of the target when the light lamp 10 is ON.

The face region searching device 30 searches a region corresponding to a face from the images and determines coordinates of the searched regions. The searched region comparison device 40 compares the searched regions corresponding to a face from the images, that is, the face regions. The analyzing device 50 performs an analysis operation including comparing intensity of indicating change in contrast between light and shade in the face regions. The protruding determination device 60 determines whether there a protrusion on the face regions based on the results of the analysis operation.

Next, a method for recognizing a protrusion on a face based on the apparatus according to an exemplary embodiment of the present invention will be described.

Figure 2:
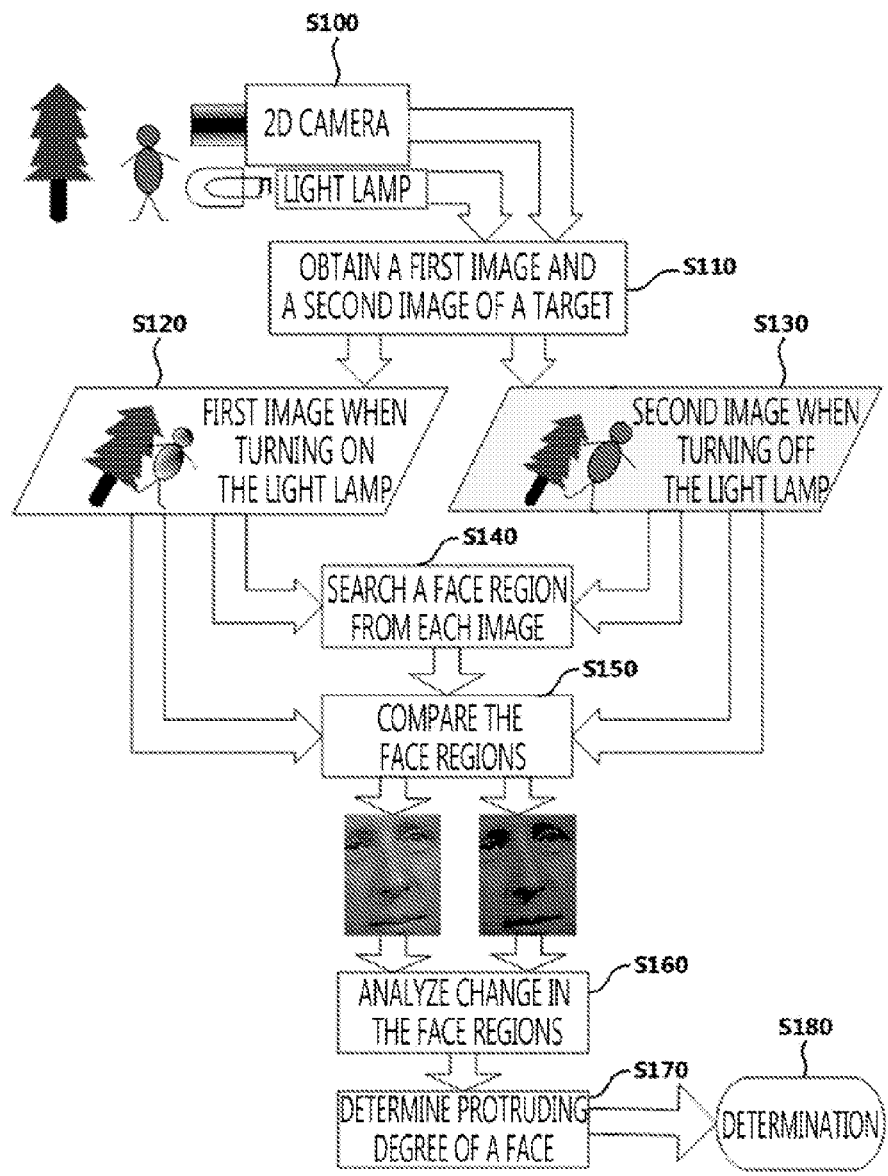
FIG. 2 shows a flowchart of a method for recognizing a protrusion on a face according to an exemplary embodiment of the present invention.

FIG. 2 shows a flowchart of a method for recognizing a protrusion on a face according to an exemplary embodiment of the present invention.

First, the image forming device 20 obtains at least two images for a target (S100-S110). Specifically, through the 2D camera 21 at a predetermined time period, the frame grabber 22 of the mage forming device 20 obtains at least two images of a target (e.g. a person) that interacts with a system in which the apparatus 1 according to an exemplary embodiment of the present invention is applied. Here, the frame grabber 22 obtains a first image of the target through the 2D camera 21 when the light lamp 10 is OFF (S120). After the predetermined time period, the frame grabber 22 turns on the light lamp 10 and then obtains a second image of the target through the 2D camera when the target is lighted (S130). It is also possible to obtain the second image first and, after the predetermined time period, to obtain the first image.

Here, the frame grabber 22 may use a target detector additionally installed in the apparatus 1 or the system in which the apparatus 1 is applied in order to detect the interaction between the target and the apparatus 1, that is, to detect whether there is a target and to detect a face of the target. Also, it is possible to detect the interaction between the target and the apparatus 1 by setting a condition related to physical contact of a person with a personal identification code (PIN) when the apparatus 1 is realized as an element included in an access control system.

As above, the first image and the second image respectively obtained when the light lamp 10 is OFF and when the light lamp 10 is ON are provided to the face region searching device 30.

The face region searching device 30 searches a face region from the first image and a face region from the second image and obtains coordinates of the searched face regions (S140). For this purpose, the first image and the second image may be processed, respectively. Here, a method for searching a region from an image and obtaining coordinates of the region may be based on techniques disclosed in the art, and its detailed description will be omitted.

The coordinates of the searched face regions obtained from the first image and the second image are provided to the searched region comparison device 40.

The searched region comparison device 40 detects a face region corresponding to a face from the images respectively based on the coordinates. For example, the searched region comparison device 40 extracts face regions, that is, fragments, from the images based on the coordinates, normalizes the face regions, finds characteristic points from the face regions, and adjusts the face regions according to coordinates of the characteristic points. Here, a process for extracting a face region from an image (it may also be referred as to an initial image) based on coordinates inputted as initial data will be performed. The process may be implemented through an algorithm for processing gradient information including characteristic indications of a face region or a method for analyzing color ingredients of an image (S150).

The searched region comparison device 40 finds characteristic points satisfying a predetermined condition from the fragments of the face regions and checks the identity of the images. That is, the searched region comparison device 40 determines whether the characteristic points obtained from each of the face regions of the first and second images are identical each other. The extracted fragments, that is, the face regions, may be mapped to the coordinates of the characteristic points. The fragments adjusted based on the coordinates of the characteristic points are input to the analyzing device 50.

The analyzing device 50 obtains vectors having values characterizing the protruding degree of a face (or relief of the face) presented in the images. For this purpose, the analyzing device 50 compares the intensity indicating the change of the contrast in the fragments based on contrast values of pixels included in the fragments and generates an intensity distribution map with the results of the comparison (S160).

Figure 3:
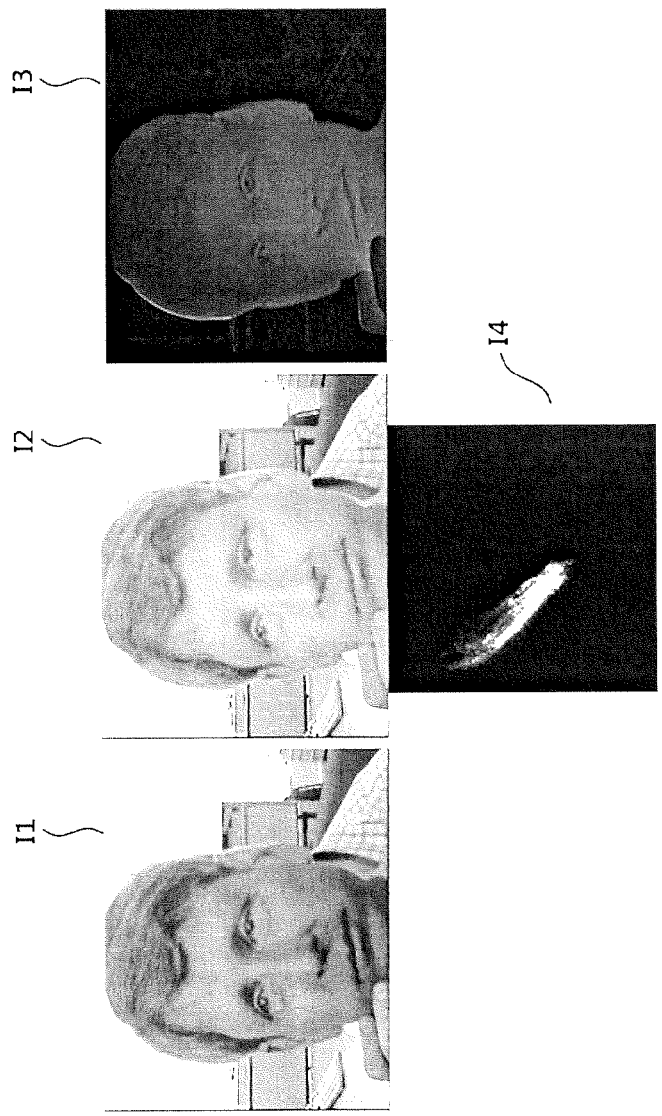
FIG. 3 shows an example of result of a process on an image of a target corresponding to a photograph of a person according to an exemplary embodiment of the present invention.
Figure 4:
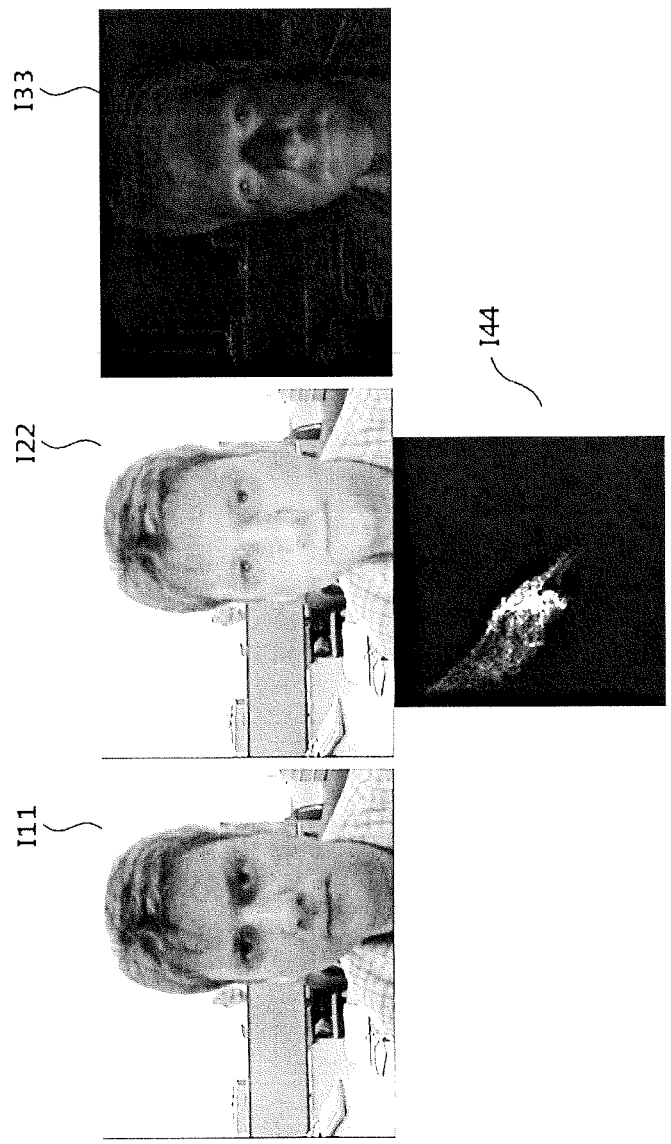
FIG. 4 shows an example of result of recognizing volume of a face in an image of a target according to an exemplary embodiment of the present invention.

FIG. 3 shows an example of results of a process on an image of a target corresponding to a photograph of a person according to an exemplary embodiment of the present invention. FIG. 4 shows an example of results of recognizing volume of a face in an image of a target according to an exemplary embodiment of the present invention.

Particularly, an image obtained by photographing a photograph of a person with a camera is shown in FIG. 3, and a volume image of a person, that is, a 3D image obtained by photographing a person with a camera is shown in FIG. 4. As shown in FIG. 3 and FIG. 4, the first images 11 and 111 are images obtained in a state of turning off the light lamp and the second images 12 and 122 are images obtained in a state of turning on the light lamp. Here, an infrared lighting apparatus is used as the light lamp.

The first image obtained in turning off the light lamp and the second image obtained in turning on the light lamp are compared each other, and thereby it is known that marked differences, based on contrast values of pixels, between the intensity indicating the change of the contrast in an region of the first image and the intensity indicating the change of the contrast in a region of the second image are shown.

The differences between the first image and the second image are shown in the third images 13 and 133 in FIG. 3 and FIG. 4, respectively. The last images 14 and 144 indicate an intensity distribution map for the first image obtained in turning on the light lamp and the second image obtained in turning off the light lamp. In the last images 14 and 144, a Y axis of a vertical axis indicates the intensity based on contrast values of pixels in the first image obtained in a case of turning on the light lamp and an X axis of a horizontal axis indicates the intensity based on contrast values of pixels in the second image obtained in a case of turning off the light lamp.

A process for generating map data is performed.

Pixel groups including pixels having the same contrast value are generated from the image obtained in a case of turning off the light lamp, wherein the image will be referred to as a "non-lighted image".

Pixels corresponding to the pixel groups generated from the non-lighted image are searched from the image obtained in a case of turning on the light lamp, wherein the image will be referred to as a "lighted image". Specifically, pixel groups (that is, second pixel groups) of the lighted image corresponding to the pixel group (that is, first pixel groups) of the non-lighted image are searched from the lighted image. Contrast values of pixels include in the first groups and contrast values of pixels included in the second pixel groups are obtained.

A map is generated based on a pair of pixels that are respectively obtained from the first pixel group and the second pixel group. That is, through a contrast value of a first pixel included in the first pixel group that is obtained from a predetermined region of the lighted image and a contrast value of a second pixel included in the second pixel group that is obtained from the same region of the non-lighted image as the predetermined region, the map including a Y axis and an X axis is generated.

Here, points on the X axis are determined based on the contrast values (e.g. 2~255) of pixels corresponding to the lighted image and points on the Y axis are determined based on the contrast values (e.g. 2~255) of pixels corresponding to the non-lighted image. That is, the X axis and the Y axis represent a contrast value of a pixel when turning on the light lamp and a contrast value of the pixel when turning off the light lamp, respectively. For example, if a contrast value of a pixel included in an image when turning on the light lamp is 200 and a contrast value of the pixel when turning off the light lamp is 150, a point corresponding to coordinates 200 and 150 on the map is set as a representative value of the pixel.

Through the above, for example, an ellipse for representing distribution for contrast values of pixels may be generated. It is determined whether there a protrusion on a corresponding region, that is, a face is determined based on the shape of the ellipse. Through the map generated to the case of the image obtained by photographing a photograph of a person with a camera in FIG. 3 and the map corresponding to the case of the 3D image of the volume image in FIG. 4, it is shown that there a marked difference between the cases.

The maps, that is, intensity distribution maps, corresponding to the images of the cases may used in estimating the protruding degree of a face present in the corresponding image.

The protruding degree may be determined based on statistical characteristics of intensity values of different images. Rectangular sections are set in the different images, respectively. The size of a cell corresponding to the section is determined according to the size of a face detected from the image. An average variance of regions included in the cell of the section is calculated.

Estimation on an index indicating the protruding degree based on the intensity distribution map may be performed with the index calculated by the following Equation 1.

$$\rho = \frac{1}{N}\sum_{i=1}^{N} std(Q_i),$$ [Equation 1]

Here, N represents the number of pixel groups obtained from an image photographed in a case in which there is no light. Qi represents a contrast value of a pixel included in an i-th group among the pixel groups obtained from an image photographed in a case in which there is light. Std(X) represents a variance calculation function for contrast values included in an X set.

A vector of a value (i.e. a statistical estimation vector) corresponding to the index calculated by Equation 1 is provided to the protruding determination device 60. The protruding determination device 60 selects one of two values corresponding to the solution. That is, the protruding device 60 determines whether there a protrusion on a face presented in the image (S170). Here, the results may be obtained by comparing protruding determination estimations having limited values.

The apparatus for recognizing a protrusion on a face according to an exemplary embodiment of the present invention may be implemented in the form of a panel and to include a video camera, a light apparatus, and at least one signal processor. Here, the signal processor may include a frame grabber 22 of an image forming device 20, a face region searching device 30, a searched region comparison device 40, an analyzing device 50, and a protruding determination device 60.

An exemplary embodiment of the present invention may not only be embodied through the above-described apparatus and/or method, but may also be embodied through a program that executes a function corresponding to a configuration of an exemplary embodiment of the present invention and through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for recognizing a protrusion on a face, comprising:
   forming a first image of a target in a condition in which the target is lighted and a second image of the target in a condition in which the target is non-lighted to obtain two images of the target;
   detecting a face region from the first image and a face region of the second image from the second image, respectively;
   comparing the face regions detected from the first and second images;
   analyzing a change of contrast in the face regions; and
   determining a protruding degree of a face corresponding to the first and second images based on the result of the analyzing.

2. The method of claim 1, wherein the detecting obtains coordinates of the face regions detected from the first image and the second image.

3. The method of claim 2, wherein the comparing extracts the face region from the image based on the coordinates, normalizes the face region, finds at least one characteristic point from the face region, and adjusts the face region based on coordinates of the characteristic point.

4. The method of claim 3, wherein the characteristic point includes points corresponding to a center, outer corners of eyes, nose wing, and corner of a mouth in the face region, and at least one pair of characteristic points is obtained from them.

5. The method of claim 1, wherein the analyzing compares intensity of indicating change in contrast of the face region obtained from the first image and intensity of indicating change in contrast of the face region obtained from the second image based on contrast values of pixels included in the face regions, and calculates statistic estimation vectors for indicating change in the intensity of the face regions.

6. The method of claim 5, wherein the determining applies a binary classification function to the statistical estimation vectors to determine the protruding degree of a face.

7. An apparatus for recognizing a protrusion on a face, comprising:
   an image forming device for forming a first image of a target in a condition in which the target is lighted and a second image of the target in a condition in which the target is non-lighted to obtain two images of the target;
   a face region searching device for detecting a face region from the first image and a face region from the second image;
   a searched region comparison device for comparing the face regions detected from the first and second images;
   an analyzing device for analyzing change in contrast of the face regions; and
   a protruding determination device for determining protruding degree of a face corresponding to the first and second images based on the result of the analyzing.

8. The apparatus of claim 7, wherein the image forming device includes
   a camera for photographing a target and a frame grabber for driving the camera and forms the first image and the second image.

9. The apparatus of claim 7, wherein the face region searching device take coordinates of the face regions detected from the first image and the second image, respectively.

10. The apparatus of claim 7, wherein the searched region comparison device extracts the face region from the image based on the coordinates, normalizes the face region, finds at least one characteristic point from the face region, and adjusts the face region based on coordinates of the characteristic point.

11. The apparatus of claim 10, wherein the characteristic point includes at least one of points corresponding to a center, outer corners of eyes, nose wing, and corner of a mouth in the face region.

12. The apparatus of claim 7, wherein the analyzing device compares intensity for indicating change in contrast of pixels included in corresponding regions for the face regions and calculates statistical estimation vectors based on change in the intensity of the face regions.

13. The apparatus of claim 12, wherein the protruding determination device applies a binary classification function to the statistical estimation vectors to determine the protruding degree of a face.

* * * * *